United States Patent Office 3,550,430
Patented Dec. 29, 1970

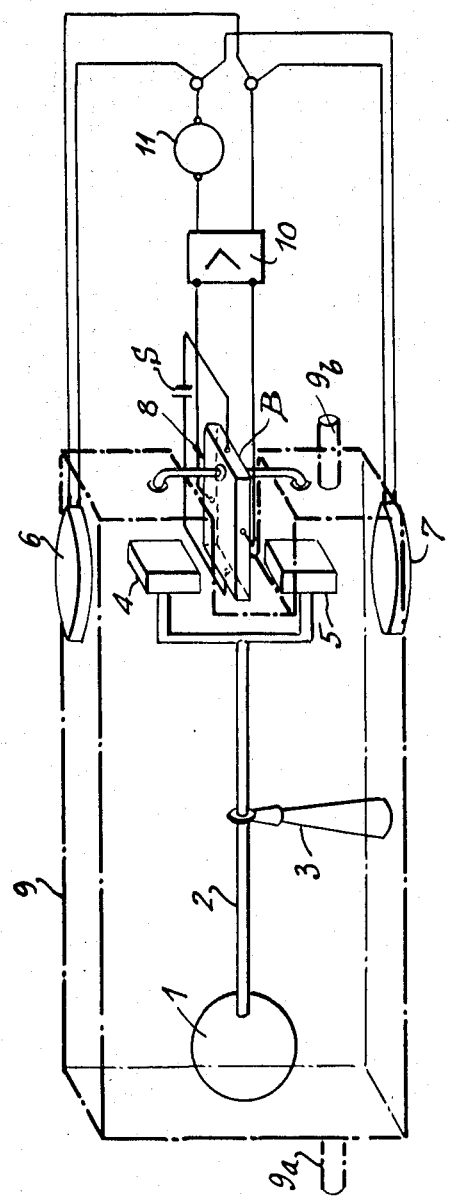

3,550,430
FORCE BALANCES
Sylvain Jean Janssen, Neuilly-sur-Seine, France, assignor to Compagnie des Compteurs, Pairs, France, a company of France
Filed June 16, 1969, Ser. No. 833,451
Claims priority, application France, July 5, 1968, 158,002
Int. Cl. G01g *1/18;* G01n *9/02*
U.S. Cl. 73—30      4 Claims

ABSTRACT OF THE DISCLOSURE

A balance beam comprising a force response device at one end and a pair of transversly displaced magnets at the other end is enclosed in a fluid tight container. A Hall plate between the magnets senses displacement of the balance and a pair of fixed coils cooperate with the magnets to rebalance the beam. The Hall plate and coils are located outside the fluid filled container.

---

Different types of force balances are known enabling measurements of various kinds to be carried out. These balances generally comprise a pickup member subjected to the action of the magnitude to be measured, and mounted on a beam whose equilibrium is re-established by means of a motor fed by an amplifier controlled by a position gap detector. A balance for measuring specific weights of a fluid, and operating on this principle, is particularly described in French Pat. No. 1,474,026 in the applicant's name.

The present invention relates to improvements applied to the carrying out of such balances.

According to a usual arrangement, the position gap detector and the motor for restoring equilibrium are immersed in the same fluid medium as the beam holding the pickup member. An arrangement of this kind has many disadvantages when said medium is particularly harmful or corrosive, on account of the composition or temperature of the fluid medium.

Actually, it is impossible to introduce into such medium, windings, wires, insulated or otherwise, made of such materials as copper, aluminium, or any other conductor entering into the construction of a balance-restoring motor. The gap detectors of the differential or variable reactor type, for instance, also comprise materials of the same kind. Moreover, photo-electric, photo-resistant cells and other semi-conducting materials, are also very sensitive to impurities likely to diffuse there and offer poor resistance to corrosion. Lastly, the intrinsic safety required for the apparatuses, often leads to a difficult dimensioning of the members traversed by the electric current when said members are immersed in a fluid that may afford inflammability dangers. It must be emphasised that the methods of protecting and enveloping coils, usually employed, generally call for polymerizable resins, adhesives or other organic materials poorly suited for certain surroundings, and which may lead to defects such as that of throwing the balance out of equilibrium by fluid absorption or sublimation.

The invention especially has the purpose of avoiding the aforementioned disadvantages, by means of an arrangement whereby the position gap detector and the motor for restoring equilibrium are separated in a fluid-tight manner from the beam of the balance on which they act by a counter-reactive force of an electro-magnetic kind, said beam being free to move in the surrounding fluid under the action of the lowest possible force, and not comprising any mechanical torque transmission outside the enclosure in which it is immersed.

The object of the invention is a force balance for measuring various magnitudes comprising a pickup member subjected to the action of the magnitude to be measured, and mounted on a beam whose equilibrium is re-established by means of a motor fed by an amplifier controlled by a position gap detector, said balance being characterized in that, on the one hand, one end of the beam is integral with two magnets so placed as to form an astatic system, cooperating both with the gap detector of a type sensitive to magnetic induction, placed between them, and with two fixed coils, with which they form the balance-restoring motor, and in that, on the other hand, the gap detector and fixed coils are separated from the beam by a non-ferromagnetic partition confining a fluid-tight enclosure resisting the pressure and enclosing said beam.

Other characteristics of the invention will be revealed by the description which follows, made with regard to the accompanying drawing and relating to a particular embodiment of the invention given by way of non-restrictive example.

The single figure shows in a diagrammatical manner, the various elements forming the balance.

In the figure, we see the pickup member 1 for measuring magnitude, formed by a spherical plunger subjected to the action of the hydrostatic thrust of a fluid, for instance. The pickup 1 is attached to one end of the beam 2 of a balance, articulated at 3 by means of a fulcrum.

The action of the magnitude to be measured on the pickup 1 subjects the beam 2 to a certain torque. A re-establishing torque is provided by a two-magnet system 4 and 5, integral with the beam 2, and subjected to the action of the magnetic fields produced by coils 6 and 7 respectively placed at a certain distance from the magnets 4 and 5.

A position gap detector 8 of a type sensitive to magnetic induction, a Hall effect probe, for instance, is placed between the magnets 4 and 5. For instance, the probe 8 is made by a thin strip conductor B traversed by a current supplied by a source S and placed perpendicularly to the field lines of the magnets 4 and 5. The potential difference due to the Hall effect along the vertical faces of the strip B is applied to an amplifier 10 on whose output circuit a galvanometer 11 is connected.

The coils 6 and 7 as well as the detector 8 are separated from the moving element of the balance (beam 2, pickup 1 and magnets 4 and 5) by a partition 9 shown by a thick dash line and confining a fluid-tight enclosure enclosing said moving element and on which are fixed the fulcrum 3 and probe 8 by an insulating link. The partition has fluid input and output pipings 9a and 9b.

The amplifier 10 connected to the detector 8 supplies the balance-restoring current to the coils 6 and 7, the intensity of said current being measured by the galvanometer 11 or any other suitable appliance.

The magnets 4 and 5 are so arranged that they form an astatic system. Their moments are of opposite directions. To this end, they are advantageously mounted on the arms of a fork forming the end of the beam 2 opposite to the one carrying the pickup 1. They are separated by a sufficient distance so that the detector 8 and partition 9 are able to be placed between them.

The partition 9 is made of a material not having any ferro-magnetic property and resisting the pressure. Titanium and certain stainless steels are advantageously used for this purpose, as well as certain plastic materials when pressures are not too great.

The lines of force coming from the poles of the magnets 4 and 5 produce at an equal distance from the poles facing each other, an induction field whose component in the direction of the common axis of said magnets is zero.

These lines of forces are not affected by the presence of the partition 9. For any unsymmertical position of the magnets 4 and 5 in relation to the detector 8, resulting from a displacement of the balance, the component of the induction level with said detector 8 according to the common axis of the magnets 4 and 5, sets up a Hall's potential difference at the terminals of the detector, which difference changes sign when the unsymmetry reverses, and which increases with the angular gap of the beam 2. This potential difference is amplified by the amplifier 10 for supplying the balance-restoring current which feeds the coils 6 and 7 mounted in series or in parallel, and suitably coiled. The induction field set up by the coils 6 and 7, respectively acts on the magnets 4 and 5 so as to re-establish the equilibrium of the beam 2. This field disturbs induction at the centre of the magnets only to an insignificant extent. For a practically fixed position of the moving element, the intensity of the current for restoring the equilibrium is proportional to the force to be measured, thus at the moment of the torque necessary for restoring the equilibrium of the balance and the galvanometer 11 thus deviates as a function of the force to be measured.

The preceding explanations bring to light a remarkable particularity of the balance according to the invention: the magnets 4 and 5 cooperate, on the one hand, with the detector 8 for measuring the angular position gap of the beam 2, and on the other hand, with the coils 6 and 7 with which they form the balance-restoring motor.

The coils 6 and 7, as well as the detector 8, are fixed to, or even mounted on the partition 9.

The detector 8 can be of any type, sensitive to magnetic induction. Although the invention has been described with reference to a Hall effect probe, this latter means can be replaced by any other equivalent means (Corbino disc, for instance).

The pickup 1 can also be of any type, different from the plunger described, sensitive to the action of the magnitude to be measured.

I claim:
1. A force balance measuring device comprising a fluid tight enclosure, means for introducing a fluid into and removing the fluid from said enclosure, said enclosure having at least a portion thereof composed of a non-magnetic material, a balance beam disposed therein, means at one end of said beam subject to the force to be measured, a pair of magnetic means at the opposite end of said beam displaced from each other in line with the direction of movement of said balance beam, means sensitive to magnetic induction between said pair of magnetic means and disposed outside of a non-magnetic portion of said fluid-tight enclosure for producing a variable potential in accordance with the displacement of the magnetic means from a symmetrical to an unsymmetrical position relative to said magnetic induction means, a pair of fixed coils disposed outside of each of said magnetic means and outside of a non-magnetic portion of said fluid-tight enclosure, circuit means connecting said variable potential with said coils whereby the current caused to flow threthrough tends to restore the magnetic means and balance beam to a null position and means for measuring the current flow to indicate the force necessary to restore the balance beam to the null position.

2. A device as claimed in claim 1 wherein the magnetic induction means comprises a Hall effect probe.

3. A device as claimed in claim 1 wherein the non-magnetic portions of said fluid-tight enclosure are composed of materials selected from the group consisting of titanium, stainless steel, aluminium, synthetic resin and glass.

4. A device as claimed in claim 1 further comprising amplifying means in said circuit means for amplifying the current flowing therethrough to the fixed coils.

References Cited
UNITED STATES PATENTS 2,874,951  2/1959  Gilbert.
3,172,493  3/1969  Koch et al.

JAMES J. GILL, Primary Examiner

H. GOLDSTEIN, Assistant Examiner

U.S. Cl. X.R.
177—212